United States Patent
Dou et al.

(10) Patent No.: US 11,988,838 B2
(45) Date of Patent: May 21, 2024

(54) DIFFRACTIVE OPTICAL WAVEGUIDE AND DISPLAY DEVICE

(71) Applicant: JIAXING UPHOTON OPTOELECTRONICS TECHNOLOGY CO., LTD., Jiaxing (CN)

(72) Inventors: Chenhao Dou, Beijing (CN); Kehan Tian, Beijing (CN)

(73) Assignee: JIAXING UPHOTON OPTOELECTRONICS TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 18/119,549

(22) Filed: Mar. 9, 2023

(65) Prior Publication Data

US 2023/0296901 A1  Sep. 21, 2023

(30) Foreign Application Priority Data

Mar. 15, 2022 (CN) .......................... 202210253806.6

(51) Int. Cl.
   *G02B 6/34* (2006.01)
   *G02B 27/01* (2006.01)

(52) U.S. Cl.
   CPC ........... *G02B 27/0172* (2013.01); *G02B 6/34* (2013.01); *G02B 2027/0123* (2013.01); *G02B 2027/0178* (2013.01)

(58) Field of Classification Search
   CPC .................. G02B 27/0172; G02B 6/34; G02B 2027/0123; G02B 2027/0178;
   (Continued)

(56) References Cited

U.S. PATENT DOCUMENTS 11,762,333 B2 *  9/2023  Qaderi ................. G02F 1/2955
                                                348/40
2012/0236415 A1  9/2012  Nagano et al.
(Continued)

FOREIGN PATENT DOCUMENTS

| CN | 202693831 U | 1/2013 |
|----|-------------|--------|
| CN | 109212641 A | 1/2019 |
| CN | 113495319 A | 10/2021 |
| CN | 113646687 A | 11/2021 |
| CN | 214623106 U | 11/2021 |
| CN | 113777707 A | 12/2021 |

(Continued)

OTHER PUBLICATIONS

European Patent Application No. 23158514.2; Extended Search Report; dated Sep. 5, 2023; 5 pages.

*Primary Examiner* — Kaveh C Kianni
*Assistant Examiner* — Hung Q Lam
(74) *Attorney, Agent, or Firm* — BakerHostetler

(57) ABSTRACT

The present application provides a diffractive optical waveguide for optical pupil expansion and a display device. The diffractive optical waveguide for optical pupil expansion comprises a waveguide substrate; a coupling-out grating disposed on or in the waveguide substrate and configured to couple input light out of the waveguide substrate by diffraction, wherein the coupling-out grating comprises a plurality of grating lines with widths; the plurality of grating lines are spaced in a cycle of a first predetermined period along a first direction and are spaced in a cycle of a second predetermined period along a second direction; each of the grating lines comprises a plurality of periodic structures in continuous and connected arrangement. Each of the periodic structures comprises a first edge and a second edge spaced in the first direction. The first predetermined period is defined as the distance between the first edge and the second edge in the first direction. The width of the first edge is equal to that of the second edge. The distance between the center of the first edge and the center of the second edge in the second direction is defined 0.5 times the second predetermined (Continued)

period. At least one of the first side edge and the second side edge of each periodic structure is a non-linear side edge.

13 Claims, 8 Drawing Sheets

(58) Field of Classification Search
CPC ............................ G02B 5/1861; G02B 5/1866; G02B 27/0081; G02B 6/00; G02B 5/18; G02B 27/01; G02B 27/42
USPC ...... 359/15, 599; 385/15, 24, 27, 28, 31, 37, 385/129–132
See application file for complete search history.

(56) References Cited

U.S. PATENT DOCUMENTS

| | | | |
|---|---|---|---|
| 2014/0016050 A1* | 1/2014 | Huang | G02B 30/32 |
| | | | 359/462 |
| 2022/0206300 A1* | 6/2022 | Park | G02B 27/4205 |
| 2023/0103057 A1* | 3/2023 | Wang | G02B 6/14 |
| | | | 385/28 |

FOREIGN PATENT DOCUMENTS

| WO | WO 2018/178626 A1 | 10/2018 |
|---|---|---|
| WO | WO 2020/188234 A1 | 9/2020 |
| WO | WO 2022/049104 A1 | 3/2022 |

\* cited by examiner

DIFFRACTIVE OPTICAL WAVEGUIDE AND DISPLAY DEVICE

CROSS-REFERENCE TO RELATED APPLICATION

The present application claims priority to Chinese Patent Application No. 202210253806.6, filed on Mar. 15, 2022, which is hereby incorporated by reference in its entirety.

BACKGROUND

The present application generally relates to the technical field of diffractive optics, and more particularly to a diffractive optical waveguide and a display device.

With the high development of semiconductor technology, the way of interaction between human and computer is developing rapidly, and Augmented Reality (AR) display, among others, can provide multidimensional information to human beings and has been widely concerned. AR glasses are one of the important mediums in the field of augmented reality display. The diffractive optical waveguide has the advantages of allowing production with high ability for mass production and a light, thin form, and is gradually approved in the field of AR display, being expected to become the mainstream technology development direction of AR field in the future. The coupling-out grating is one of the essential components of the diffractive optical waveguide. One-dimensional grating is often used as a part of the grating structure in the coupling-out grating of the diffractive optical waveguide. Conventional one-dimensional gratings used in the coupling-out grating of the diffractive optical waveguide are mainly in linear structure, as shown in FIG. 1.

However, the coupling-out grating having linear structure has problems that the uniformity of output light is poor, and the coupling-out efficiency of the grating decays fast with the angle of incidence increasing, which thereby leads to a significant change in the brightness of the image observed by the human eyes moving in the eye box of the diffractive optical waveguide, resulting in poor display effect and significantly affecting the user experience.

Therefore, it is necessary to improve the diffractive optical waveguide to solve at least one technical problem.

SUMMARY

The present application is proposed to solve at least one of the above-mentioned problems. Specifically, the first aspect of the present application provides a diffractive optical waveguide for optical pupil expansion, comprising:
  a waveguide substrate;
  a coupling-out grating disposed on or in the waveguide substrate and configured to couple input light out of the waveguide substrate by diffraction, wherein,
  the coupling-out grating comprises a plurality of grating lines with widths; the plurality of grating lines are spaced in a cycle of a first predetermined period along a first direction and are spaced in a cycle of a second predetermined period along a second direction; each of the grating lines comprises a plurality of periodic structures in continuous and connected arrangement,
  wherein, each of the periodic structures comprises a first edge and a second edge spaced apart in the first direction; the first predetermined period is defined as the distance between the first edge and the second edge in the first direction; the width of the first edge is equal to the width of the second edge; the width of the first edge and the width of the second edge are each smaller than the second predetermined period; the distance between the center of the first edge and the center of the second edge in the second direction is defined 0.5 times the second predetermined period,
  each of the periodic structures further comprises a first side edge connecting the first edge and the second edge, and a second side edge connecting the first edge and the second edge; the first side edge is opposite to the second side edge; at least one of the first side edge and the second side edge is a non-linear side edge.

Exemplarily, the second direction is orthogonal or non-orthogonal to the first direction.

Exemplarily, the shape of the non-linear side edge is one of: a polyline, an arc, or a combination of a straight line and an arc.

Exemplarily, the first side edge and the second side edge each is a non-linear side edge, wherein,
  the first side edge and the second side edge each is in the shape of a polyline, or the first side edge and the second side edge each is an arc, or the first side edge and the second side edge each is a combination of a straight line and an arc.

Exemplarily, a center line is defined as a line connecting the midpoint of the first edge and the midpoint of the second edge, and the distance from the first side edge to the center line in the second direction is equal to the distance from the second side edge to the center line in the second direction.

Exemplarily, a center line is defined as a line connecting a midpoint of the first edge and a midpoint of the second edge; a symmetry midpoint is defined as a point at equal distance to the first edge and to the second edge in the center line along the first direction; the periodic structure is in a center-symmetrical shape and is symmetrical with respect to the symmetry midpoint.

Exemplarily, the width of each of the grating lines is defined by the distance between the first side edge and the second side edge of the periodic structures in the second direction, and the width of the grating lines is constant.

Exemplarily, the plurality of grating lines are configured such that a predetermined condition for uniformity of photon energy distribution of a project optical field, which is resulted from the input light in different incident directions being coupled out of the coupling-out grating, is met.

Exemplarily, the predetermined condition includes that the value of the uniformity is lower than 10%.

Exemplarily, the diffractive optical waveguide for optical pupil expansion further comprises:
  a coupling-in grating disposed on or in the waveguide substrate and configured to couple the input light into the waveguide substrate to allow it to be coupled to the coupling-out grating by total reflection.

In a further aspect, the present application also provides a display device comprising the aforementioned diffractive optical waveguide.

Exemplarily, the display device is a near-eye display device, comprising:
  A lens and a frame for holding the lens near eyes, the lens including said diffractive optical waveguide.

Exemplarily, the display device is an augmented reality display device or a virtual reality display device.

In the diffractive optical waveguide for optical pupil expansion according to the present application, the distance between the center of the first edge and the center of the second edge of the coupling-out grating is defined 0.5 times the second predetermined period, and at least one of the first side edge and the second side edge of the coupling-out gratings is a non-linear side edge, such that uniformity of photon energy distribution of a project optical field resulted from the input light in different incident directions being coupled out of the coupling-out grating is better, while the rate of the coupling-out efficiency decaying with the angle of incidence is reduced. As such, human eyes can feel a more moderate change in brightness of light in different incident directions when wearing an optical waveguide display device, without a significant change in the brightness of the image observed by the human eyes moving in the eye box of the diffractive optical waveguide. This improves the display effect of the display device having the diffractive optical waveguide, and thereby improves the user experience.

Since the display device of the present application comprises the aforementioned diffractive optical waveguide, it has substantially the same advantages as the diffractive optical waveguide.

BRIEF DESCRIPTION OF THE DRAWINGS

In order to illustrate the technical solutions in the embodiments of the present application more clearly, the following briefly introduces the drawings that need to be used in the description of the embodiments. Apparently, the drawings described in the following are only some embodiments of the present application. For those of ordinary skilled in the art, other drawings can also be obtained from these drawings without creative work.

DETAILED DESCRIPTION

In order to make the objectives, technical solutions and advantages of the present application more apparent, the exemplary embodiments according to the present application will be described in detail below with reference to the accompanying drawings. Apparently, the described embodiments are only a part of the embodiments of the present application, rather than all the embodiments of the present application, and it should be understood that the present application is not limited by the example embodiments described herein. Based on the embodiments of the present application described herein, all other embodiments obtained by those skilled in the art without creative work shall fall within the protection scope of the present application.

In the following description, numerous specific details are set forth in order to provide a more thorough understanding of the present application. However, it is obvious to those skilled in this art that the present application may be implemented without one or more of these details. Some technical features well-known in this art are not described in other examples in order to avoid confusion with the present application.

It is to be understood that the present application can be implemented in various forms but should not be construed as being limited to the embodiments set forth herein. On the contrary, these embodiments are provided to make the disclosure thorough and complete and the scope of the application be completely delivered to those skilled in the art.

The use of the terms provided herein is intended merely to illuminate the embodiments and does not pose a limitation on the application. When they are used herein, the terms "a", "an" and "the" in the singular form are also intended to include the plural, unless otherwise indicated herein. It should still be understood that the terms "comprising" and/or "including" are used in the description to determine the presence of the features, integers, steps, operations, elements and/or components but not to exclude the presence or addition of one or more other features, integers, steps, operations, elements, components and/or groups. When they are used herein, the terms "and/or" include any or all combinations of related listed items.

In order to understand the present application thoroughly, a detailed structure is provided in the following description so as to elucidate the technical solutions presented in the present application. Alternative embodiments of the present application are illustrated in detail as below. However, the present application may further have other embodiments in addition to these detailed descriptions.

Figure 2A:
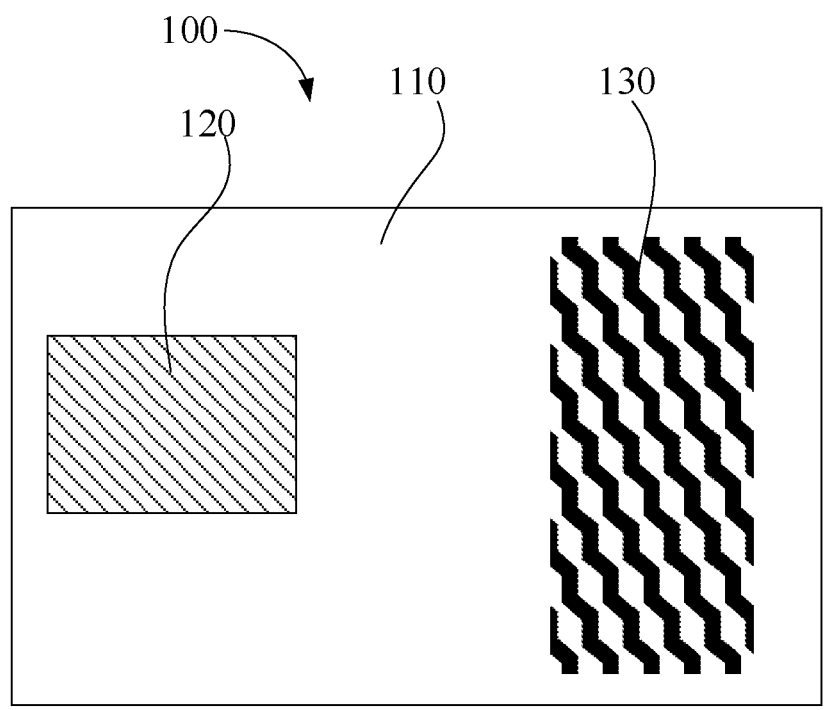
FIG. 2A shows a schematic diagram of a diffractive optical waveguide according to an embodiment of the present application.

In order to solve the aforementioned technical problems, the present application provides a diffractive optical waveguide for optical pupil expansion. FIG. 2A schematically shows an example of the diffractive optical waveguide for optical pupil expansion according to an embodiment of the present invention, i.e., the diffractive optical waveguide 100. As shown in FIG. 2A, the diffractive optical waveguide 100 comprises a waveguide substrate 110. The waveguide substrate 110 can be made of glass, optical plastic, or other optical transmission materials.

Alternatively, the waveguide substrate 110 can have first and second substantially flat surfaces, wherein the first surface is opposite to the second surface, wherein the first surface can be the surface of the display device with the waveguide substrate 110 on the side facing the viewer's eyes. With the waveguide substrate 110, light may propagate in a direction substantially parallel to the first surface and the second surface through total internal reflection.

Further, as shown in FIG. 2A, the diffractive optical waveguide 100 of the present application further comprises a coupling-in grating 120 and a coupling-out grating 130. The coupling-in grating 120 is disposed on or in the waveguide substrate 110 and is configured to couple the input light into the waveguide substrate 110 to allow it to be coupled to the coupling-out grating 130 by total reflection. The coupling-out grating 130 is disposed on or in the waveguide substrate 110 and is configured to couple input light out of the waveguide substrate 110 by diffraction to allow the viewer's eyes to receive the coupled-out light. When light coupled into the coupling-in grating 120 is, for example, the image light projected by a projector, the light coupled out of the coupling-out grating 130 is at least a portion of the image light, and the portion of the image light is guided to the viewer's eyes through the coupling-out grating 130, such that the image projected by the projector is visible to the viewer's eyes. Wherein, the coupling-out grating 130 serves as pupil expansion, which can refer to an input of a low field of view (FOV) being changed into an output of a high FOV. It is worth mentioning that the coupling-out grating shown in FIG. 2A may be a partial region of the complete coupling-out grating of the diffractive optical waveguide, and the complete coupling-out grating can also include one or more other coupling-out regions. The other coupling-out regions can be formed with a two-dimensional grating structure, a one-dimensional grating structure, or a combination of the one-dimensional grating structure and the two-dimensional grating structure, or the like.

Figure 2B:
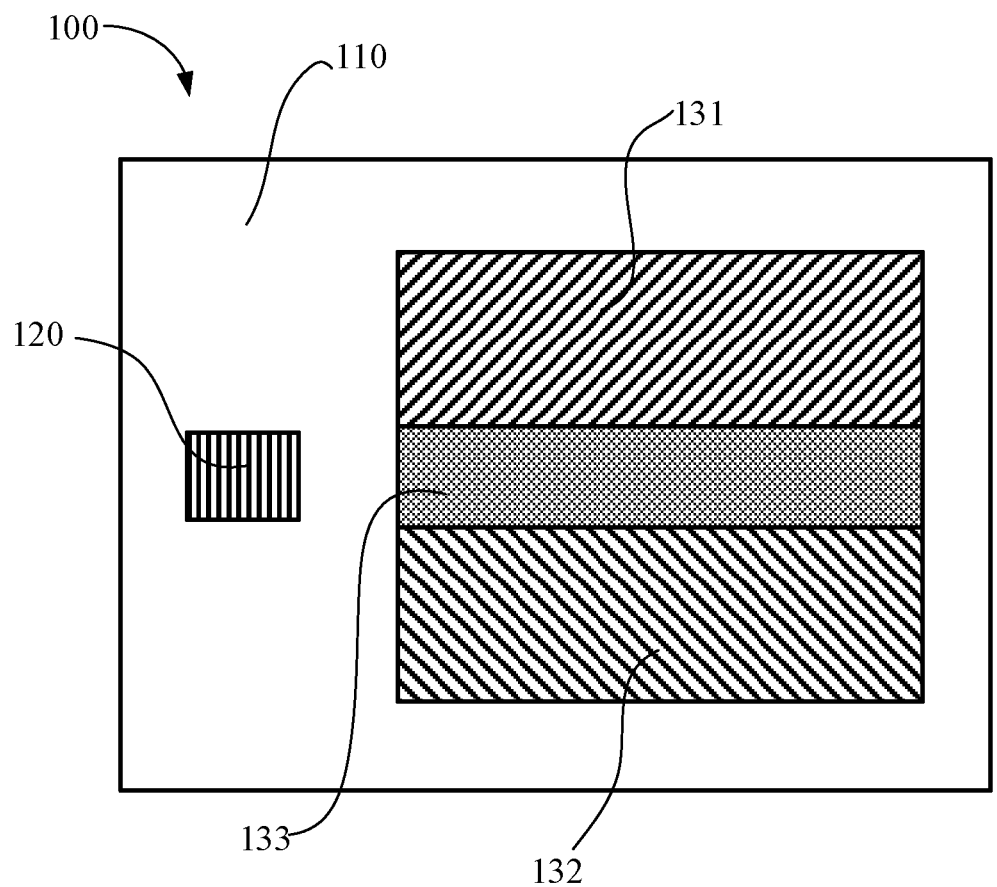
FIG. 2B shows a schematic diagram of a diffractive optical waveguide according to another embodiment of the present application.

In another example of the present application, as shown in FIG. 2B, the coupling-in grating 120 can be a one-dimensional grating, such as a linear grating, or other gratings of suitable types. The coupling-in grating 120 and the coupling-out grating are located on the same side surface of the waveguide substrate 110. The coupling-out grating can comprise a first coupling-out grating 131, a second coupling-out grating 132, and a third coupling-out grating 133. At least one of the first coupling-out grating 131 and the second coupling-out grating 132 can be implemented as a one-dimensional grating structure (the specific structural form will be described below) according to an embodiment of the present application. The third coupling-out grating 133 can be a two-dimensional grating structure, wherein the two-dimensional grating structure comprises a plurality of periodic structures. The periodic structure of the two-dimensional grating can have the shape of a polygon, such as a hexagon. The third coupling-out grating 133 can be located between the first coupling-out grating 131 and the second coupling-out grating 132, and can be configured such that a minority of light into the third coupling-out grating 133 is coupled out of the waveguide substrate 110 towards the viewer's eyes, and the majority of light into the third coupling-out grating 133 propagate by diffraction towards the region where the first coupling-out grating 131 and the second coupling-out grating 132 are located. The first coupling-out grating 131 and the second coupling-out grating 132 are used to couple light out of the waveguide substrate 110 towards the viewer's eyes.

In some embodiments, the coupling-in grating 120 can also be implemented by some other optical devices having coupling function, such as a prism, a reflective polarizer, or a mirror with reflection function.

The coupling-in grating 120 can be an optical element including a periodic structure, which can be fabricated by any suitable microfabrication process. For example, the grating can be fabricated on the surface of or inside the waveguide substrate 110 by photolithography, or on the waveguide substrate 110 by nanoimprint lithography, thereby forming a surface relief diffraction grating.

The coupling-in grating 120 and the coupling-out grating 130 can be located on the same side of the waveguide substrate 110, for example, both are disposed on the first surface of the waveguide substrate 110, or can be located on different sides. Alternatively, in some embodiments, the diffractive optical waveguide 100 can further comprise a turning grating, whereby light is coupled into the waveguide substrate 110 through the coupling-in grating 120 and into the turning grating through the waveguide substrate 110 by total reflection, and propagates through the turning grating along a first predetermined direction and then is coupled out of the coupling-out grating 130 along a second predetermined direction, wherein the first predetermined direction is different from the second predetermined direction.

In order to allow for a more uniform optical field of light output from the coupling-out grating 130, in the present application, the coupling-out grating 130 can comprise a plurality of grating lines with widths as shown in FIG. 2A. The plurality of grating lines are spaced in a cycle of a first predetermined period along a first direction, and are spaced in a cycle of a second predetermined period along a second direction, wherein the vector direction of the coupling-out grating 130 can be determined based on the first direction and the second direction. In the present application the light coupled out through the coupling-out grating 130 will be parallel to the direction of the incident light, thereby avoiding the occurrence of stray light in other directions and improving the uniformity for output light and relative coupling-out efficiency.

Further, as shown in FIGS. 3A to 6C, each of the grating lines comprises a plurality of periodic structures 200 in continuous and connected arrangement. Each of the periodic structures 200 comprises a first edge 201 and a second edge 202 spaced in the first direction (corresponding to an X direction). The first predetermined period $d_1$ is defined as the distance between the first edge 201 and the second edge 202 in the first direction. The width w of the first edge 201 is equal to the width w of the second edge 202. The width w of the first edge 201 and the width w of the second edge 202 are each smaller than the second predetermined period $d_2$. The distance $d_w$ between the center of the first edge 201 and the center of the second edge 202 in the second direction (corresponding to a Y direction) is defined 0.5 times the second predetermined period $d_2$. Each of the periodic structures 200 further comprises a first side edge 211 connecting the first edge 201 and the second edge 202, and a second side edge 212 connecting the first edge 201 and the second edge 202. The first side edge 211 is opposite to the second side edge 212. At least one of the first side edge 211 and the second side edge 212 is a non-linear side edge.

In some examples, the second direction (corresponding to the Y direction) can be orthogonal to the first direction (corresponding to the X direction), for example, as shown in FIGS. 3A, 4A, 5A, and 6A; in other examples, the second direction (corresponding to the Y direction) can be non-orthogonal direction to the first direction (corresponding to the X direction), as shown in FIGS. 3C, 4C, 5C and 6C. When the first direction is non-orthogonal to the second direction, the included angle between the first direction and the second direction can be reasonably determined depending on actual needs.

Wherein, the length of the first predetermined period $d_1$ can be reasonably determined depending on actual needs, the length of the second predetermined period $d_2$ can be reasonably determined depending on actual needs, and the width of the first edge 201 and the width of the second edge 202 can also be reasonably determined depending on actual needs. These are not specifically limited here.

In the present application, the distance between the center of the first edge 201 and the center of the second edge 202 of the coupling-out grating 130 along the second direction being defined 0.5 times the second predetermined period $d_2$, and at least one of the first side edge 211 and the second side edge 212 of the coupling-out grating 130 being a non-linear side edge, allows for better uniformity of photon energy distribution of a project optical field resulted from the input light in different incident directions being coupled out of the coupling-out grating 130, without a significant change in the brightness of the image observed by the human eyes moving in the eye box of the diffractive optical waveguide 100. This improves the display effect of the display device having the diffractive optical waveguide 100, and thereby improves the user experience.

Each of the grating lines of the coupling-out grating 130 according to the present application is formed from a plurality of periodic structures 200 in continuous and connected arrangement, which can also be referred to as a one-dimensional grating structure. Wherein, the number of periodic structures 200 of each of the grating lines can be reasonably determined depending on actual needs. For example, the coupling-out grating 130 can comprise 3 and more periodic structures 200 arranged in the first direction and 3 and more periodic structures 200 arranged in the second direction, wherein a unit characteristic range can be defined by the first predetermined period $d_1$ and the second predetermined period $d_2$ serving as length and width respectively, and each unit characteristic range can include one periodic structure 200.

In some examples, the shape of the non-linear side edge is one of: a polyline, an arc, or a combination of a straight line and an arc, or any other suitable shape structures. Wherein, the polyline shape can have one and more bends; the arc shape can be in the form of an arc or several arcs connected one by one; the combination of the straight line and arc can also be in the form of a straight line connected with an arc, or several straight lines and an arc connected one by one, or several straight lines and several arcs connected one by one. Wherein, the bend angle of polyline-shaped non-linear side edge and the curving radian of arc-shaped non-linear side edge can be adjusted depending on actual needs, and are not specifically limited here.

At least one of the first side edge 211 and the second side edge 212 of the periodic structure 200 is a non-linear side edge. For example, one of the first side edge 211 and the second side edge 212 is a non-linear side edge, and the other is a linear side edge. For another example, the first side edge 211 and the second side edge 212 both are non-linear side edges.

Figure 3A:
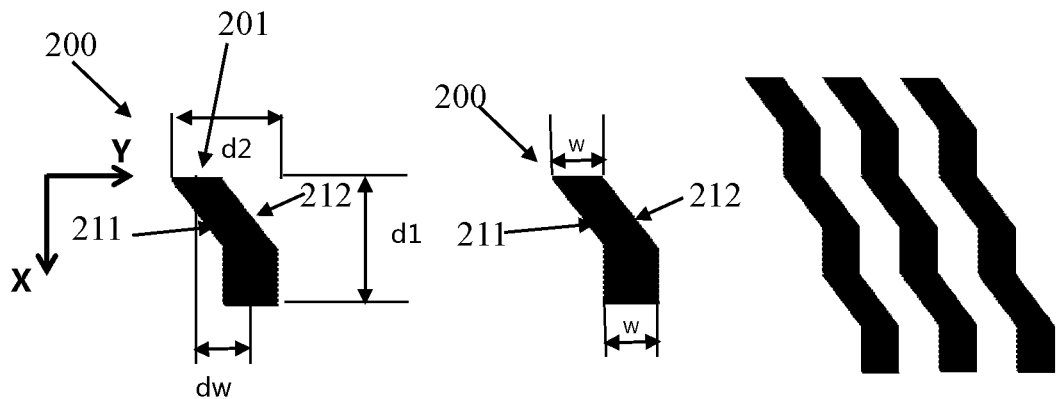
FIG. 3A shows a schematic diagram of the periodic structure of the coupling-out grating of the diffractive optical waveguide according to an embodiment of the present application.
Figure 5A:
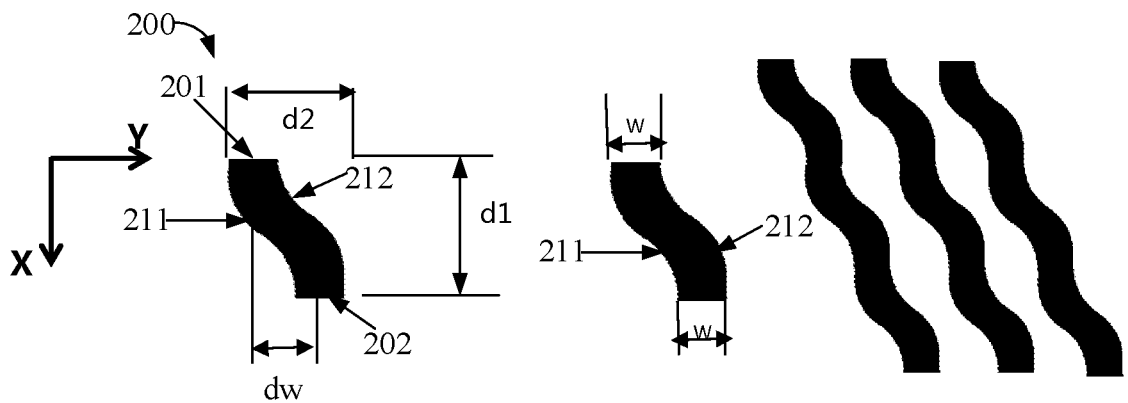
FIG. 5A shows a schematic diagram of the periodic structure of the coupling-out grating of the diffractive optical waveguide according to yet another embodiment of the present application.
Figure 5B:
FIG. 5B shows a schematic diagram of the coupling-out grating with the periodic structure shown in FIG. 5A according to an embodiment of the present application.
Figure 5C:
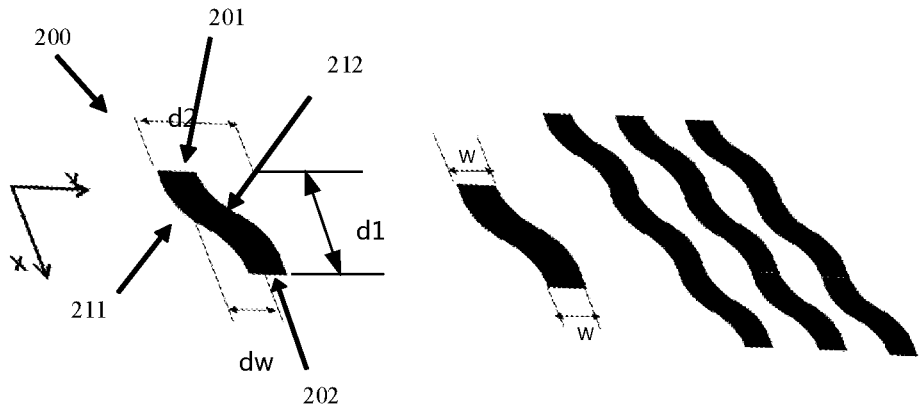
FIG. 5C shows a schematic diagram of the periodic structure of the coupling-out grating of the diffractive optical waveguide according to another embodiment of the present application.
Figure 6A:
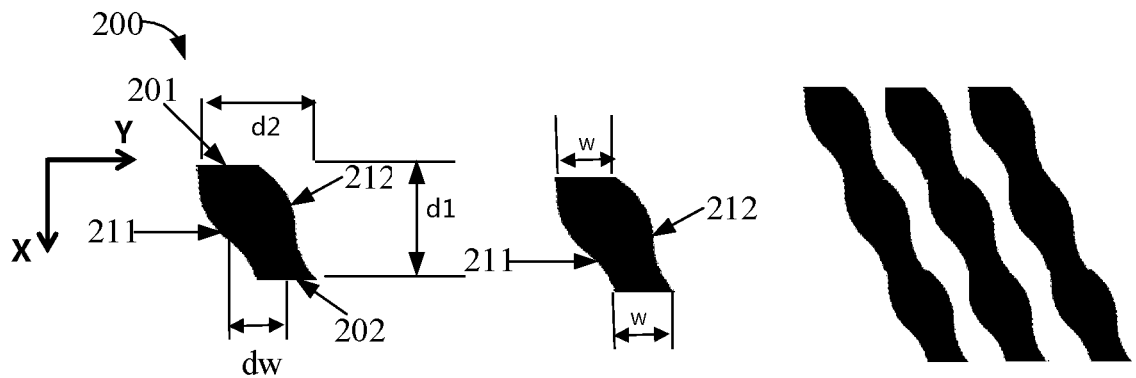
FIG. 6A shows a schematic diagram of the periodic structure of the coupling-out grating of the diffractive optical waveguide according to yet another embodiment of the present application.
Figure 6B:
FIG. 6B shows a schematic diagram of the coupling-out grating with the periodic structure shown in FIG. 6A according to an embodiment of the present application.
Figure 6C:
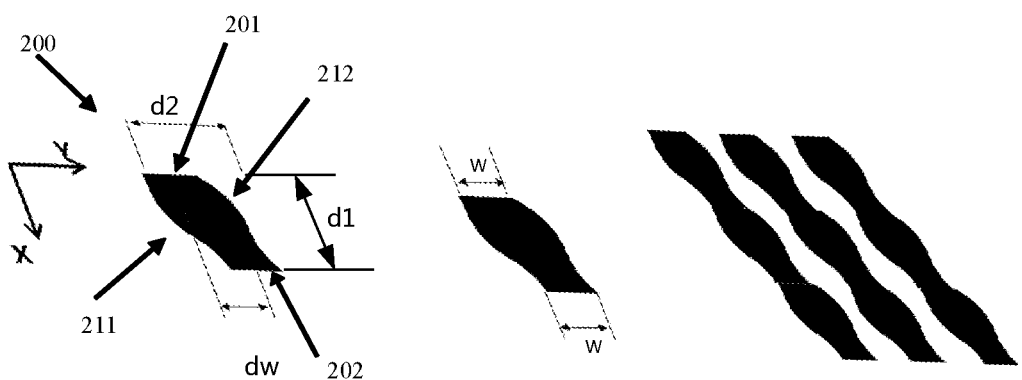
FIG. 6C shows a schematic diagram of the periodic structure of the coupling-out grating of the diffractive optical waveguide according to another embodiment of the present application.
Figure 7A:
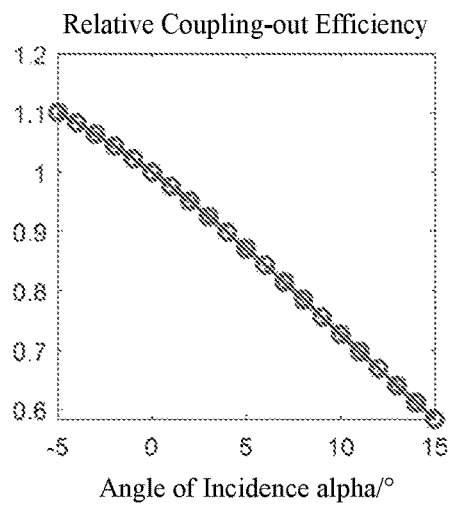
FIG. 7A shows a schematic diagram of relative coupling-out efficiency of light with different angles of incidence of the linear coupling-out grating shown in FIG. 1.
Figure 7B:
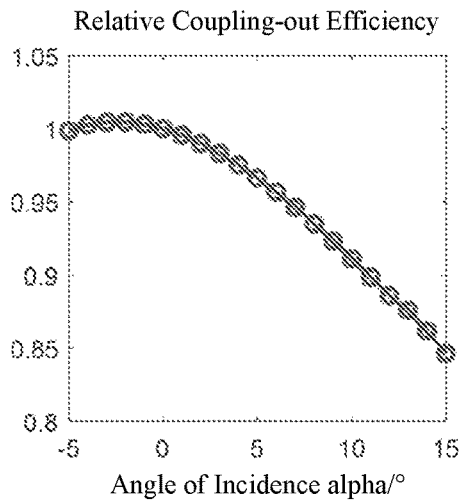
FIG. 7B shows a schematic diagram of relative coupling-out efficiency of the coupling-out grating shown in FIG. 3B for light with different angles of incidence.
Figure 7C:
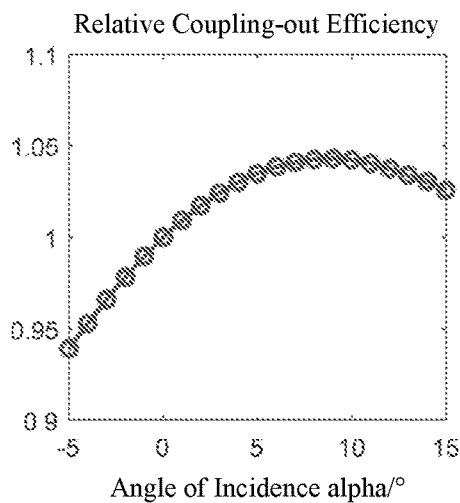
FIG. 7C shows a schematic diagram of relative coupling-out efficiency of the coupling-out grating shown in FIG. 4B for light with different angles of incidence.
Figure 7D:
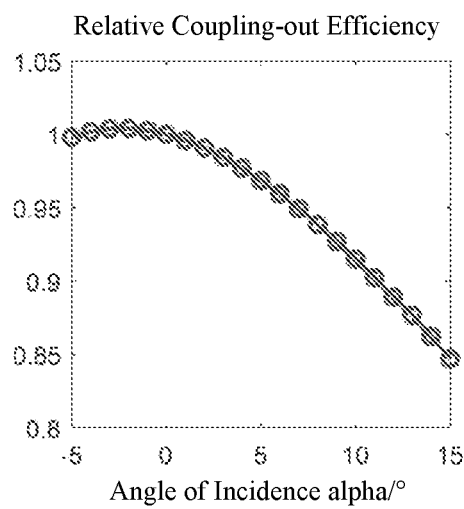
FIG. 7D shows a schematic diagram of relative coupling-out efficiency of the coupling-out grating shown in FIG. 5B for light with different angles of incidence.
Figure 7E:
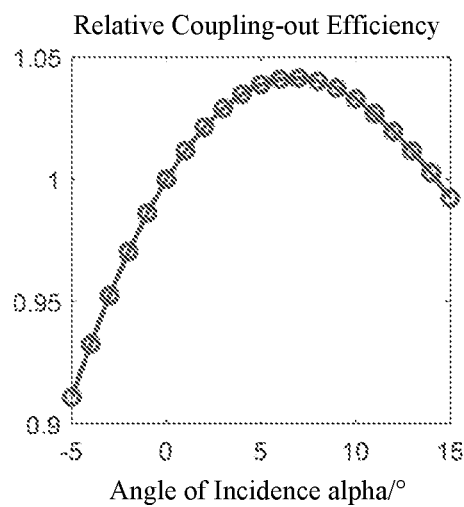
FIG. 7E shows a schematic diagram of relative coupling-out efficiency of the coupling-out grating shown in FIG. 6B for light with different angles of incidence.

When the first side edge 211 and the second side edge 212 both are non-linear side edges. Alternatively, as shown in FIGS. 3A, 3B, 4A and 4B, the first side edge 211 and the second side edge 212 can be each in the shape of polyline, such that a plurality of periodic structures 200 in cycle of continuous and connected arrangement can form a grating line that generally is a continuous polyline structure. Or, as shown in FIGS. 5A and 5B, the first side edge 211 and the second side edge 212 can be each arc-shaped, so that a plurality of periodic structures 200 in cycle of continuous and connected arrangement can form a grating line that generally is a continuous curvilinear structure. Or, as shown in FIGS. 6A and 6B, the first side edge 211 and the second side edge 212 are each in the shape of a combination of straight lines and arcs, so that a plurality of periodic structures 200 in cycle of continuous and connected arrangement can form a grating line that generally is a continuous curvilinear structure. In addition to the various shapes shown in the figures, the periodic structure 200 of the present application can also be implemented in other suitable shapes. For example, if possible, the first side edge 211 and the second side edge 212 can also be non-linear side edges of different shapes.

Differently shaped periodic structure 200 can also be different in other features. For example, for the periodic structure 200 as shown in FIG. 4A, a center line is defined as the line connecting the midpoint of the first edge 201 and the midpoint of the second edge 202, a symmetry midpoint is defined as the point at equal distance to the first edge 201 and to the second edge 202 in the center line along the first direction, and this periodic structure 200 is in a center-symmetrical shape and is symmetrical with respect to the symmetry midpoint. For the periodic structure 200 as shown in FIG. 6A, which is in generally axisymmetric geometry, a center line is defined as the line connecting the midpoint of the first edge 201 and the midpoint of the second edge 202, and the distance from the first side edge 211 to the center line in the second direction is equal to the distance from the second side edge 212 to the center line in the second direction.

In some examples, when the first side edge 211 and the second side edge 212 both are non-linear side edges, the protruding/recessing orientation of the first side edge 211 and the protruding/recessing orientation of the second side edge 212 are the same or different. As shown in FIGS. 3A and 5A, for example, the protruding/recessing orientation of the first side edge 211 is the same as the protruding/recessing orientation of the second side edge 212. In the case where the first side edge 211 and the second side edge 212 are polyline-shaped, the protruding/recessing orientation of the first side edge 211 being the same as the protruding/recessing orientation of the second side edge 212, allows the width of the grating line to be generally consistent along the grating line, e.g., generally is a constant value. The same protruding/recessing orientation means that the first side edge 211 and the second side edge 212 are protruded or recessed in the same orientation, or part of them are both protruded in the same orientation as well as part of them are both recessed in the same orientation.

In some examples, when the protruding/recessing orientation of the first side edge 211 is different from the protruding/recessing orientation of the second side edge 212, the protruding/recessing orientation of the first side edge 211 is substantially opposite to the protruding/recessing orientation of the second side edge 212, for example, as shown in FIGS. 4A and 6A.

In some examples, the width of each of the grating lines is defined by the distance between the first side edge 211 and the second side edge 212 of the periodic structures 200 in the second direction, and the width of the grating lines is constant, for example, as shown in FIGS. 3A, 3B, 5A, 5B. Alternatively, in other examples, the widths of the grating lines can also be variable as shown in FIGS. 4A, 4B, 6A and 6B, and the variation can be periodic. Alternatively, the widths of the grating lines can be smaller than the second predetermined period $d_2$ due to intervals between neighboring grating lines.

Figure 4A:
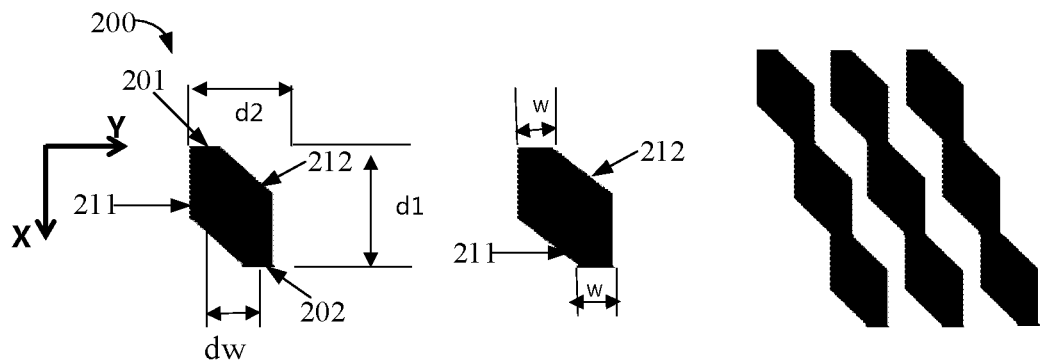
FIG. 4A shows a schematic diagram of the periodic structure of the coupling-out grating of the diffractive optical waveguide according to another embodiment of the present application.
Figure 4B:
FIG. 4B shows a schematic diagram of a coupling-out grating with the periodic structure shown in FIG. 4A according to an embodiment of the present application.
Figure 4C:
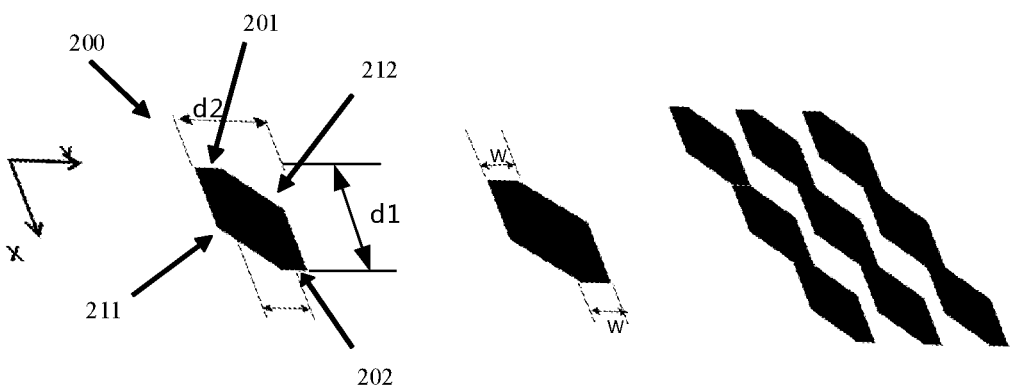
FIG. 4C shows a schematic diagram of the periodic structure of the coupling-out grating of the diffractive optical waveguide according to another embodiment of the present application.

In some examples, the width of the first edge 201 and the width of the second edge 202 of the grating lines are smaller than the width of a portion of the grating lines between the first edge 201 and the second edge 202, as shown in the coupling-out grating of FIGS. 4A and 4B. In other examples, the portion of the grating lines between the first edge 201 and the second edge 202 can comprise not only a section of width that is greater than the width of the first edge 201 and the second edge 202 of the grating lines, but also a section of width that is smaller than the width of the first edge 201 and the second edge 202, as shown in the coupling-out grating of FIGS. 6A and 6B.

The plurality of grating lines of the coupling-out grating 130 can have substantially the same periodic structure 200. Alternatively, in an example, the coupling-out grating 130 can comprise a plurality of groups of grating lines. The grating lines in different groups have various shapes, that is, the periodic structures 200 in different groups of grating lines have various shapes, wherein several groups of the grating lines in different shapes can be adjacent along the first direction, or can also be adjacent along the second direction, which is not specifically limited here.

In some examples, the structures of the coupling-out gratings 130 as shown in FIGS. 3A, 3B, 4A and 4B are approximately ideal grating structures, and, if considering manufacturing, their sharp tips in the first side edge 211 and the second side edge 212 can also be rounded in manufacturing.

It is worth mentioning that the coupling-out grating 130 of the present application can serve as a complete coupling-out grating 130 structure of the diffractive optical waveguide 100, or can also serve as a part of the complete coupling-out grating 130 structure of the diffractive optical waveguide 100.

Wherein, the coupling-out grating 130 can be fabricated by any suitable microfabrication process. For example, the grating can be fabricated on the surface of or inside the waveguide substrate 110 by photolithography or on the waveguide substrate 110 by nanoimprint lithography, thereby forming a surface relief diffraction grating. Wherein, the grating line can be formed as a bulge on the surface of the waveguide substrate 110, and the height of the bulge can be reasonably determined depending on actual needs. It is worth mentioning that the shape of the coupling-out grating 130 in the present application is shown in its top surface parallel to the surface of the optical waveguide (i.e., the surface on which the coupling-out grating 130 is disposed), and it can be a cross-sectional shape taken in a plane substantially parallel to the surface of the optical waveguide, or can be a projected shape projected onto a plane parallel to the surface of the optical waveguide.

The plurality of grating lines of the coupling-out grating 130 according to the present application are configured such that a predetermined condition for uniformity of photon energy distribution of a project optical field, which is resulted from the input light in different incident directions being coupled out of the coupling-out grating, is met. For example, the predetermined condition includes that the value of the uniformity is lower than 10% or other adequate values, wherein the photon energy of the project optical field can be characterized by the relative coupling-out efficiency for the project light with different angles of incidence. In the present application, the uniformity can be calculated by such formula that, uniformity=(maximum relative coupling-out efficiency−minimum relative coupling-out efficiency)/(maximum relative coupling-out efficiency+minimum relative coupling-out efficiency).

Figure 1:
FIG. 1 shows a schematic diagram of a conventional linear optical waveguide.
Figure 3B:
FIG. 3B shows a schematic diagram of a coupling-out grating with the periodic structure shown in FIG. 3A according to an embodiment of the present application.
Figure 3C:
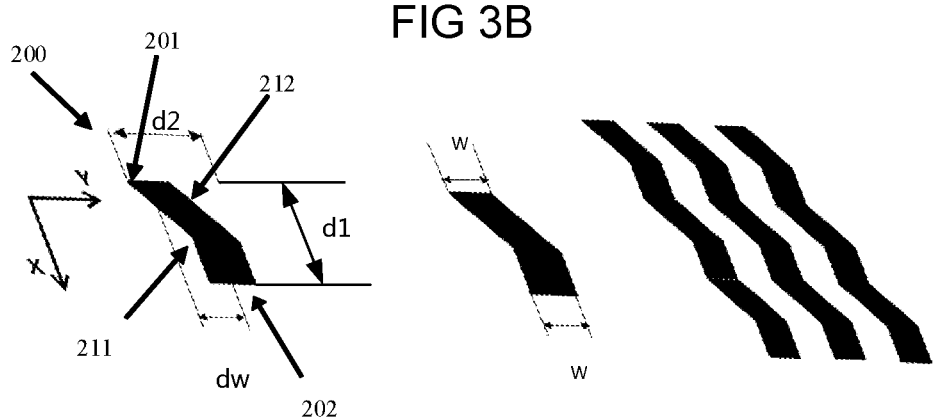
FIG. 3C shows a schematic diagram of the periodic structure of the coupling-out grating of the diffractive optical waveguide according to another embodiment of the present application.

Simulation calculations are carried out for the traditional one-dimensional linear grating shown in FIG. 1 and four types of coupling-out grating 130 structures shown in FIGS. 3B, 4B, 5B and 6B in this application. In the calculation process in reference to the coupling-out efficiency for incident light at angle of incidence of 0°, the respective relative coupling-out efficiencies when the angle of incidence change from −5° to +15° are calculated so as to obtain the respective curves of relative coupling-out efficiency of the gratings (as illustrate in FIGS. 7A to 7E, respectively), as well as uniformity (i.e., coupling-out uniformity) for these different angles of incidence of these gratings. The computed results are shown in the table below:

| Types of coupling-out gratings | Coupling-out uniformity for different angles of incidence |
|---|---|
| One-dimensional linear grating shown in FIG. 1 | 30.7% |
| One-dimensional grating shown in FIG. 3B | 8.6% |
| One-dimensional grating shown in FIG. 4B | 5.2% |
| One-dimensional grating shown in FIG. 5B | 8.5% |
| One-dimensional grating shown in FIG. 6B | 6.7% |

Wherein, the value of the coupling-out uniformity being smaller means that it is more uniform. From the computed results in the table, it can be seen that coupling-out uniformity of the one-dimensional coupling-out grating according to the present application is much better than that coupling-out uniformity of the traditional one-dimensional linear grating.

To sum up, in the diffractive optical waveguide for optical pupil expansion according to the present application, the distance $d_w$ between the center of the first edge 201 and the center of the second edge 202 of the coupling-out grating in the second direction being defined 0.5 times the second predetermined period $d_2$, and at least one of the first side edge and the second side edge of the coupling-out gratings being a non-linear side edge, makes it possible that uniformity of photon energy distribution of a project optical field resulted from the input light in different incident directions being coupled out of the coupling-out grating is better, while the rate of the coupling-out efficiency decaying with the angle of incidence is reduced. As such, human eyes can feel a more moderate change in brightness of light in different incident directions when wearing an optical waveguide display device, without a significant change in the brightness of the image observed by the human eyes moving in the eye box of the diffractive optical waveguide. This improves the display effect of the display device having the diffractive optical waveguide, and thereby improves the user experience.

Further, the present application further provides a display device, which can comprise the aforementioned diffractive optical waveguide 100. The description of the diffractive optical waveguide 100 can be referred to the above and will not be repeated here.

Figure 8:
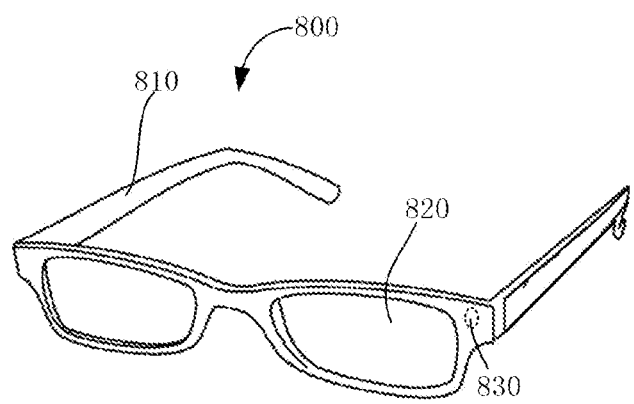
FIG. 8 shows a schematic diagram of an exemplary display device.

The display device can be any device comprising the aforementioned diffractive optical waveguide 100. As shown in FIG. 8, for example, the display device 800 can be a near-eye display device, which may comprise: a lens 820 and a frame 810 for holding the lens near eyes, the lens 820 including the diffractive optical waveguide 100.

In some examples, as shown in FIG. 8, the display device 800 can further comprise an optical source 830. Alternatively, the optical source 830 can project image light to the diffractive optical waveguide, e.g., to the area where the coupling-in grating of the diffractive optical waveguide is located. Wherein, the optical source can be micro displays, such as a laser beam scanning (LBS), a digital light procession (DLP), a digital micromirror device (DMD), liquid crystal on silicon (LCOS), a micro electromechanical system (MEMS), an organic light emitting diode (OLED), and the like. The light emitted by the optical source is visible light.

The light (e.g., image light) projected by the optical source to the diffractive optical waveguide is coupled into the waveguide substrate through the coupling-in grating and to the coupling-out grating by totally reflection, and coupled out of the coupling-out grating and then comes into the eyes of viewer of the near-eye device, such that the image projected by the optical source is visible to the viewer's eyes. Wherein, in the diffractive optical waveguide for optical pupil expansion, the distance between the center of the first edge and the center of the second edge of the coupling-out grating in the second direction being defined 0.5 times the second predetermined period, and at least one of the first side edge and the second side edge of the coupling-out gratings being a non-linear side edge, makes it possible that uniformity of photon energy distribution of a project optical field resulted from the input light in different incident directions being coupled out of the coupling-out grating is better, without a significant change in the brightness of the image observed by the human eyes moving in the eye box of the diffractive optical waveguide. This improves the display effect of the display device having the diffractive optical waveguide, and thereby improves the user experience.

In some embodiments, the display device is an augmented reality display device or a virtual reality display device, wherein the augmented reality display device includes but is not limited to the devices such as augmented reality (AR) glasses, a vehicle head-up display (HUD), or the like.

It should be noted that the above-described embodiments are intended to illustrate but not limit the application, and alternative embodiments can be devised by those skilled in the art without departing from the scope of the appended claims. In the claims, any reference signs in parentheses shall not be construed as limiting the claim. The application can be implemented by means of hardware comprising several different elements as well as by means of a suitably programmed computer. In a unit claim listing several devices, some of these devices can be presented by the same one of hardware. The use of the words, such as first, second, and third, does not denote any order. These words can be interpreted as terms.

The invention claimed is:

1. A diffractive optical waveguide for optical pupil expansion, comprising:
    a waveguide substrate;
    a coupling-out grating disposed on or in the waveguide substrate and configured to couple input light out of the waveguide substrate by diffraction, wherein,
    the coupling-out grating comprises a plurality of grating lines with widths; the plurality of grating lines are spaced in a cycle of a first predetermined period along a first direction and are spaced in a cycle of a second predetermined period along a second direction; each of the grating lines comprises a plurality of periodic structures in continuous and connected arrangement,
    wherein, each of the periodic structures comprises a first edge and a second edge spaced apart in the first direction; the first predetermined period is defined as the distance between the first edge and the second edge in the first direction; the width of the first edge is equal to the width of the second edge; the width of the first edge and the width of the second edge are each smaller than the second predetermined period; the distance between the center of the first edge and the center of the second edge in the second direction is defined 0.5 times the second predetermined period,
    each of the periodic structures further comprises a first side edge connecting the first edge and the second edge, and a second side edge connecting the first edge and the second edge; the first side edge is opposite to the second side edge; at least one of the first side edge and the second side edge is a non-linear side edge.

2. The diffractive optical waveguide of claim 1, wherein the second direction is orthogonal or non-orthogonal to the first direction.

3. The diffractive optical waveguide of claim 1, wherein the shape of the non-linear side edge is one of: a polyline, an arc, or a combination of a straight line and an arc.

4. The diffractive optical waveguide of claim 1, wherein the first side edge and the second side edge each is a non-linear side edge, wherein,
    the first side edge and the second side edge each is in the shape of a polyline, or the first side edge and the second side edge each is in the shape of an arc, or the first side edge and the second side edge each is in the shape of a combination of a straight line and an arc.

5. The diffractive optical waveguide of claim 4, wherein a center line is defined as a line connecting the midpoint of the first edge and the midpoint of the second edge, and the distance from the first side edge to the center line in the second direction is equal to the distance from the second side edge to the center line in the second direction.

6. The diffractive optical waveguide of claim 4, wherein a center line is defined as a line connecting the midpoint of the first edge and the midpoint of the second edge; a symmetry midpoint is defined as a point at equal distance to the first edge and to the second edge in the center line along the first direction; the periodic structure is in a center-symmetrical shape and is symmetrical with respect to the symmetry midpoint.

7. The diffractive optical waveguide of claim 4, wherein the width of each of the grating lines is defined by the distance between the first side edge and the second side edge of the periodic structures in the second direction, and the width of the grating lines is constant.

8. The diffractive optical waveguide of claim 1, wherein the plurality of grating lines are configured such that a predetermined condition for uniformity of photon energy distribution of a project optical field, which is resulted from the input light in different incident directions being coupled out of the coupling-out grating, is met.

9. The diffractive optical waveguide of claim 8, wherein the predetermined condition includes that the value of the uniformity is lower than 10%, wherein the value of the uniformity is calculated based on uni=(maxeffi−mineff)/(maxeff+mineff), uni representing the value of the uniformity, maxeff representing maximum relative coupling-out efficiency, and mineff representing minimum relative coupling-out efficiency.

10. The diffractive optical waveguide of claim 1, further comprising:
 a coupling-in grating disposed on or in the waveguide substrate and configured to couple the input light into the waveguide substrate to allow it to be coupled to the coupling-out grating by total reflection.

11. A display device comprising a diffractive optical waveguide of claim 1.

12. The display device of claim 11, wherein the display device is a near-eye display device, comprising: a lens and a frame for holding the lens near eyes, the lens including said diffractive optical waveguide.

13. The display device of claim 11, wherein the display device is an augmented reality display device or a virtual reality display device.

* * * * *